(12) United States Patent
Sirotkin et al.

(10) Patent No.: US 10,932,158 B2
(45) Date of Patent: Feb. 23, 2021

(54) APPARATUS, SYSTEM AND METHOD OF OFFLOADING TRAFFIC OF A SECONDARY CELL GROUP (SCG)

(71) Applicant: Apple Inc., Cupertino, CA (US)

(72) Inventors: Alexander Sirotkin, Giv'on Hachadasha (IL); Muthaiah Venkatachalam, Beaverton, OR (US); Alexandre S. Stojanovski, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/746,312

(22) Filed: Jan. 17, 2020

(65) Prior Publication Data

US 2020/0267600 A1 Aug. 20, 2020

Related U.S. Application Data

(63) Continuation of application No. 15/550,123, filed as application No. PCT/US2015/052081 on Sep. 25, 2015, now Pat. No. 10,555,216.
(Continued)

(51) Int. Cl.
*H04W 28/08* (2009.01)
*H04W 36/00* (2009.01)
(Continued)

(52) U.S. Cl.
CPC ......... *H04W 28/085* (2013.01); *H04W 28/12* (2013.01); *H04W 36/0022* (2013.01);
(Continued)

(58) Field of Classification Search
CPC ... H04W 28/085; H04W 28/12; H04W 36/04; H04W 36/125; H04W 36/24;
(Continued)

(56) References Cited

U.S. PATENT DOCUMENTS 10,555,216 B2  2/2020  Sirotkin et al.
2012/0214445 A1*  8/2012  Stojanovski ........ H04L 12/4633
                                              455/411
(Continued)

FOREIGN PATENT DOCUMENTS

WO  2015021597 A1  2/2015

OTHER PUBLICATIONS

New Study Item Proposal on Extension of Dual Connectivity in EUTRAN, 3GPP TSG RAN Meeting #66 RP-142257, Maui, USA, Dec. 8-11, 2014, 6 pages.
(Continued)

*Primary Examiner* — Joshua Kading
(74) *Attorney, Agent, or Firm* — Sterne, Kessler, Goldstein & Fox P.L.L.C.

(57) ABSTRACT

Some demonstrative embodiments include devices, systems and methods of offloading traffic of a Secondary Cell Group (SCG). For example, some embodiments may include identifying a SCG bearer that is offloadable to the Internet via a Network Address Translation (NAT) gateway, based on offloading information received from a Master Evolved Node B (eNB) (MeNB); and offloading uplink Internet Protocol (IP) packets of the SCG bearer to the Internet via the NAT gateway, if the SCG bearer is indicated to be offloadable.

20 Claims, 7 Drawing Sheets

Related U.S. Application Data

(60) Provisional application No. 62/130,991, filed on Mar. 10, 2015.

(51) Int. Cl.
  *H04W 28/12* (2009.01)
  *H04W 36/06* (2009.01)
  *H04W 92/20* (2009.01)
  *H04W 36/04* (2009.01)
  *H04W 36/22* (2009.01)
  *H04W 36/24* (2009.01)
  *H04W 36/38* (2009.01)
  *H04W 36/12* (2009.01)
  *H04W 88/16* (2009.01)
  *H04W 88/08* (2009.01)

(52) U.S. Cl.
  CPC ........... *H04W 36/04* (2013.01); *H04W 36/06* (2013.01); *H04W 36/125* (2018.08); *H04W 36/22* (2013.01); *H04W 36/24* (2013.01); *H04W 36/38* (2013.01); *H04W 92/20* (2013.01); *H04W 36/0069* (2018.08); *H04W 88/08* (2013.01); *H04W 88/16* (2013.01)

(58) Field of Classification Search
  CPC . H04W 36/38; H04W 36/06; H04W 36/0022; H04W 36/22; H04W 36/0069; H04W 92/20; H04W 88/08; H04W 88/16
  See application file for complete search history.

(56) References Cited

U.S. PATENT DOCUMENTS

| | | | |
|---|---|---|---|
| 2013/0230011 A1 | 9/2013 | Rinne et al. | |
| 2014/0064188 A1* | 3/2014 | D'Souza | H04W 88/16 370/328 |
| 2015/0201364 A1* | 7/2015 | Yamada | H04W 28/08 370/235 |
| 2015/0271726 A1 | 9/2015 | Kim et al. | |
| 2017/0013511 A1 | 1/2017 | Dai et al. | |
| 2017/0208501 A1 | 7/2017 | Lee et al. | |
| 2017/0231026 A1 | 8/2017 | Vesterinen et al. | |
| 2017/0332422 A1 | 11/2017 | Ohta et al. | |
| 2017/0374578 A1* | 12/2017 | Selvaganapathy | H04W 28/08 |
| 2018/0049062 A1 | 2/2018 | Sirotkin et al. | |
| 2019/0364423 A1* | 11/2019 | Ingale | H04W 12/0401 |

OTHER PUBLICATIONS

3GPP TS 36.300 V11.7.0 (Sep. 2013); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) Sep. 2013, 209 pages.

ETSI TS 136 413 V12.4.0 (Feb. 2015) LTE; Evolved Universal Terrestrial Radio 20 Access Network (E-UTAN); S1 Application Protocol (S1AP) (3GPP TS 36.413 version 12.4.0 Release 12) Feb. 2015, 305 pages.

Alcatel-Lucent et al., "Support of collocated SIPTO in dual connectivity", R3-150205, 3GPP TSG-RAN WG3 Meeting #87, Athens, Greece, Jan. 30, 2015, 4 pages.

Huawei, "Discussion on the enhancement for SIPTO in DC", R3-150067, 3GPP TSG-RAN WG3 Meeting #87, Athens, Greece, Jan. 30, 2015, 7 pages.

Alcatel-Lucent et al., Security functionality for dual connectivity:, S3-140957, 3GPP TSG-SA3 Meeting #75, Sapporo, Japan, May 19, 2014, 8 pages.

International Search Report and Written Opinion for PCT/US2015/052081, dated Feb. 16, 2016, 10 pages.

International Preliminary Report on Patentability for PCT/US2015/052081, dated Sep. 21, 2017, 7 pages.

* cited by examiner

APPARATUS, SYSTEM AND METHOD OF OFFLOADING TRAFFIC OF A SECONDARY CELL GROUP (SCG)

CROSS REFERENCE

This application is a continuation of U.S. application Ser. No. 15/550,123 entitled "Apparatus System and Method of Offloading Traffic of a Secondary Cell Group (SCG), filed Aug. 17, 2017, which is a 371 of PCT/US2015/052081 entitled "Apparatus, System and Method of Offloading Traffic of a Secondary Cell Group (SCG), claims the benefit of and priority from U.S. Provisional Patent Application No. 62/130,991 entitled "Selective IP Traffic Offload With Dual Connectivity", filed Mar. 10, 2015, the entire disclosure of which is incorporated herein by reference.

TECHNICAL FIELD

Some embodiments described herein generally relate to offloading traffic of a Secondary Cell Group (SCG).

BACKGROUND

A Dual-Connectivity scheme may be configured to enable a User Equipment (UE) to consume radio resources provided by two different network nodes, for example, a Master Evolved Node B (eNB) (MeNB) and a Secondary eNB (SeNB).

The MeNB may be an eNB, which may serve as an anchor towards a Core Network (CN), for example, via a connection with a Mobility Management Entity (MME), e.g., via an S1-MME interface. The MeNB may be connected to a plurality of SeNBs, which may be able to provide additional radio resources to the UE.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
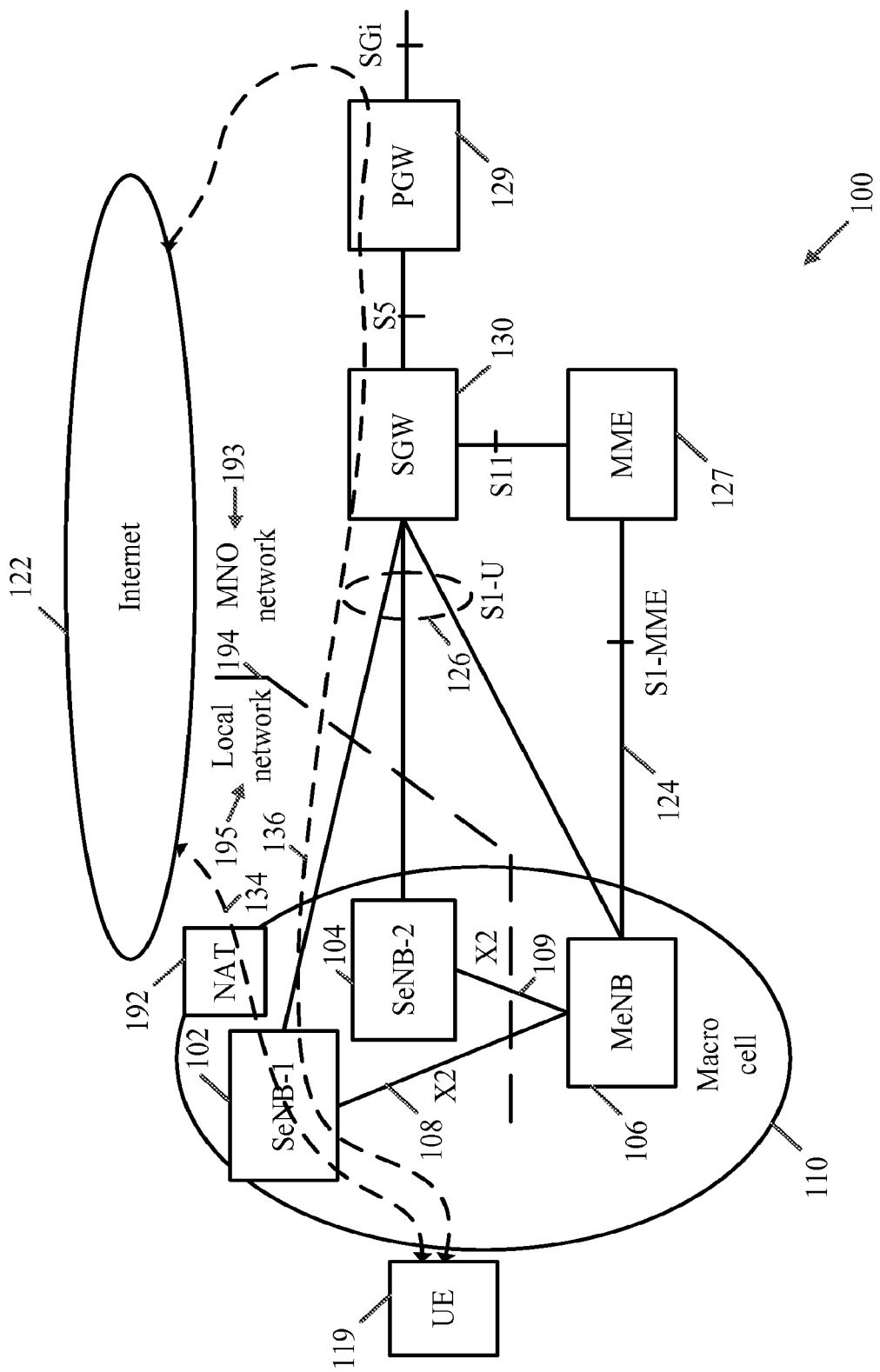
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a cellular node, a relay node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multistandard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including 3GPP TS 36.300 (3*GPP TS* 36.300 *V*11.7.0 (2013 *September*); *Technical Specification; 3rd Generation Partnership Project; Technical Specification Group Radio Access Network; Evolved Universal Terrestrial Radio Access* (*E-UTRA*) *and Evolved Universal Terrestrial Radio Access Network* (*E-UTRAN*); *Overall description; Stage* 2 (*Release* 11)); and/or 3GPP TS 36.413 (*ETSI TS* 136 413 *V*12.4.0 (2015 *February*) *LTE; Evolved Universal Terrestrial Radio Access Network* (*E-UTRAN*); *S*1 *Application Protocol* (*S*1*AP*) (3*GPP TS* 36.413 *version* 12.4.0 *Release* 12))), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16*e*, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; *IEEE* 802*ad* ("*IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band*", 28 *Dec.,* 2012)) and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, 4.5G, Fifth Generation (5G) mobile networks, 3GPP, Long Term Evolution (LTE) cellular system, LTE advance cellular system, LTE Unlicensed systems, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a node (also referred to as a "base station"), or the like. The linking between a carrier frequency of the downlink resources and a carrier frequency of the uplink resources may be indicated in system information transmitted on the downlink resources.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMAX cellular network, and the like.

Some demonstrative embodiments may be used in conjunction with a Heterogeneous Network (HetNet), which may utilize a deployment of a mix of technologies, frequencies, cell sizes and/or network architectures, e.g., including cellular, millimeter wave ("mmWave" or "mmW"), and/or the like. In one example, the HetNet may include a radio access network having layers of different-sized cells ranging from large macrocells to small cells, for example, picocells and femtocells. Other embodiments may be used in conjunction with any other suitable wireless communication network.

Reference is now made to FIG. 1, which schematically illustrates a block diagram of a system 100, in accordance with some demonstrative embodiments. In one example, cellular system 100 may include a 4$^{th}$ generation cellular system such as, for example, a long-term evolution (LTE) or LTE advance cellular system, and the like, or a 5G cellular system. In other embodiments, system 100 may include any other cellular system.

As shown in FIG. 1, in some demonstrative embodiments, system 100 may include a plurality of nodes, e.g., including nodes 102, 104 and/or 106, capable of communicating content, data, information and/or signals with one or more User Equipment (UE) 119, e.g., as described below.

In some demonstrative embodiments, nodes 102, 104 and/or 106 may be configured to operate as eNBs and/or to provide one or more functionalities of an eNB, e.g., to one or more UE 119, which may be connected to nodes 102, 104 and/or 106. For example, nodes 102, 104 and/or 106 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In some demonstrative embodiments, system 100 may be configured according to a Dual-Connectivity (DC) scheme, which may be configured to enable UE 119 to consume radio resources provided by two different network nodes, for example, a Master Evolved Node B (eNB) (MeNB) and a Secondary eNB (SeNB), e.g., as described below.

In some demonstrative embodiments, node 106 may be configured to operate as a MeNB, which may be configured to control a Macro Cell 110 (also referred to as a "Master Cell Group (MCG)").

In some demonstrative embodiments, MeNB 106 may be configured to serve as an anchor towards a Core Network (CN), for example, via a connection with a Mobility Management Entity (MME) 127, e.g., via an S1-MME interface 124. For example, MME may be connected to a Serving Gateway (SGW) 130, e.g., via a S11 interface. As shown in FIG. 1, for example, SGW 130 may be connected to a Packet Data Network (PDN) Gateway (PGW) 129, e.g., via a S5 interface.

In some demonstrative embodiments, the capacity of the Macro cell 110 controlled by MeNB may be enhanced and/or boosted, e.g., in one or more areas of the cell, by connecting MeNB 106 to a plurality of SeNBs. For example, node 102 may be configured to operate as a first SeNB, denoted SeNB-1, and/or node 104 may be configured to operate as a second SeNB, denoted SeNB-2. The SeNB-1 102 may be connected to MeNB 106 via an X2 connection 108, and/or the SeNB-2 104 may be connected to MeNB 106 via an X2 connection 109.

In some demonstrative embodiments, SeNB 102 and/or SeNB 104 may be configured to provide additional radio resources to the UE 119. As shown in FIG. 1, SeNBs 102 and 104 may not operate as a MeNB. For example, as shown in FIG. 1, SeNB 102 and SeNB 104 may not terminate an S1-MME interface with MME 127.

In some demonstrative embodiments, SeNB 102 and/or SeNB 104 may be configured to control a group (also referred to as "Secondary Cell Group (SCG)") of serving cells. For example, SeNB 102 may communicate with UE 119 traffic of a one or more first SCG bearers using radio resources of SeNB 102, and/or SeNB 104 may communicate with UE 119 traffic of one or more second SCG bearers using radio resources of SeNB 104, e.g., according to the dual connectivity scheme.

In some demonstrative embodiments, MeNB 106, SeNB 102, and/or SeNB 104 may be connected to SGW 130 by S1-U interfaces 126.

In some demonstrative embodiments, although SeNB 102 and/or SeNB 104 may be within macro cell 110 under the coverage of MeNB 106, in some scenarios and/or use cases, SeNB 102 and/or SeNB 104 may be deployed in locations that are outside of a network (also referred to as "Mobile Network Operator's (MNO's) network") 193, which may be controlled by the MNO. For example, SeNB 102 and/or SeNB 104 may be deployed as part of a local network 195, for example, in customer premises, at an office, at a shopping mall, and the like. For example, as shown in FIG. 1, a boundary 194 between the MNO's network 193 and the local network 195 may separate between MeNB 106 and SeNBs 102 and/or 104.

In some demonstrative embodiments, as shown in FIG. 1, SeNB 102 and/or SeNB 104 may be connected to the MNO network 193, for example, by connections which may cross the boundary 194, for example, via the X2 connections 108 and 109, which may be connected to MeNB 106, and/or via S1-U interfaces 126, which may be connected to SGW 130.

In some demonstrative embodiments, the X2 connections 108 and/or 109 may be configured to communicate both Control Plane (C-plane) and User Plane (U-plane) traffic between MeNB 106 and SeNBs 102 and/or 104.

In some demonstrative embodiments, S1-U interfaces 126 may be configured to communicate U-plane traffic, e.g., between SGW 130 and SeNB 102, SeNB 104, and/or MeNB 106.

In some demonstrative embodiments, one or more elements of system 100 may be configured to enable Selective IP Traffic Offload (SIPTO) for dual connectivity, for example, to offload traffic communicated between UE 119 and the Internet 122, e.g., as described below.

In some demonstrative embodiments, one or more elements of system 100 may be configured to support SIPTO at a local network, e.g., local network 195, as described below.

In some demonstrative embodiments, one or more elements of system 100 may be configured to enable offloading traffic of a SCG bearer to the Internet 122, e.g., as described below.

In some demonstrative embodiments, it may be advantageous for the MNO to be able to offload Internet traffic, e.g., all Internet traffic, at a SeNB, for example, instead of having to backhaul the Internet traffic to the Evolved Packet Core, e.g., if the local network 195 has direct access to the Internet 122.

In some demonstrative embodiments, one or more elements of system 100 may be configured to offload Internet traffic to the Internet 122 at SeNB 102, e.g., via a route 134, which may not need to go through the EPC, for example, instead of backhauling the Internet traffic to the EPC via a route 136, e.g., via SGW 130.

In some demonstrative embodiments, MeNB 106 may be configured to support SIPTO at MeNB 106. However, offloading traffic at the MeNB 106 may still not enable to perform the traffic offloading at SeNB 102 and/or SeNB 104, without going through the backhaul route 136. For example, although the X2 connections 108 and 109 are shown in FIG. 1 as short straight lines between MeNB 106 and the SeNBs 102 and 104, actual transport of X2 traffic may involve resource-consuming "hairpins", e.g., via the MNO's backhaul network.

In some demonstrative embodiments, one or more elements of system 100 may be configured to perform SIPTO at an SeNB, for example, SeNB 102 and/or SeNB 104, e.g., as described below.

In some demonstrative embodiments, a local gateway (L-GW) function may be collocated with a SeNB. In some scenarios, at time of activation of a SIPTO PDN connection at MME 127, an address of the L-GW collocated with the SeNB may not yet be available to the MME 127. For example, an activation of SeNB 102 may occur after activation of a SIPTO PDN connection at MME 27, e.g., at an E-UTRAN Radio Access Bearer (E-RAB) SETUP REQUEST. According to these embodiments, conventional SIPTO mechanisms may not be able to support dual connectivity with the collocated L-GW function. Accordingly, the conventional SIPTO mechanisms may not be able to support offloading of a SCG bearer at SeNB 102 and/or SeNB 104.

In some demonstrative embodiments, system 100 may be configured to implement an IP traffic mechanism, which may be configured to enable offloading SCG bearers, for example, directly, from SeNB 102 and/or SeNB 104 in dual connectivity, e.g., as described below.

In some demonstrative embodiments, system 100 may be configured to offload traffic of an SCG bearer to the Internet 122 via at least one Network Address Translation (NAT) gateway 192, e.g., as described below.

In some demonstrative embodiments, SeNB 102 may be configured to receive information ("offload information"), e.g., an offload indication, to indicate which SCG bearers may be offloaded to the Internet 122, e.g., at SeNB 102; and/or SeNB 104 may be configured to receive offload information, e.g., an offload indication, to indicate which SCG bearers may be offloaded to the Internet 122, e.g., at SeNB 104.

In some demonstrative embodiments, SeNB 102 and/or SeNB 104 may be configured to receive the offload information from the CN, for example, via MeNB 106, for example, since SeNB 102 and/or SeNB 104 may not have an S1-MME connection to MME 127, e.g., as described above.

In some demonstrative embodiments, MeNB 106 may be configured to receive the offload information corresponding to SeNB 102 and/or SeNB 104 from MME 127, e.g., via S1-MME connection 124.

In some demonstrative embodiments, MeNB 106 may be configured to receive the offload information corresponding to SeNB 102 and/or SeNB 104 via an Information Element (IE) in a [S1-AP] E-RAB SETUP REQUEST message, and/or via any other IE and/or message.

In some demonstrative embodiments, MeNB 106 may be configured to send the offload information to SeNB 102, e.g., via X2 connection 108, and/or to SeNB 104, e.g., via X2 connection 109. For example, MeNB 106 may be configured to send the offload information to SeNB 102 and/or SeNB 104 via an enhanced [X2-AP] SENB ADDITION REQUEST message, and/or any other message.

In some demonstrative embodiments, MeNB 106 may be configured to move an SCG bearer to SeNB 102 and/or to move an SCG bearer to SeNB 104, for example, according to a dual connectivity procedure, e.g., using a SENB ADDITION REQUEST X2AP message, and/or any other message.

In some demonstrative embodiments, MeNB 106 may be configured to include in a SENB ADDITION REQUEST X2AP message corresponding to an SCG bearer of a SeNB an IE including an offload indication to indicate whether or not SeNB is allowed to offload traffic of the SCG ("offloadable SCG") to the Internet 122, e.g., according to a SIPTO mechanism.

In some demonstrative embodiments, SeNB 102 may be configured to selectively offload uplink traffic belonging to an SCG bearer of SeNB 102, for example, based on the offload indication, e.g., as may be received in the IE of the X2AP message corresponding to the SCG bearer.

In some demonstrative embodiments, SeNB 102 may be configured to offload traffic of an SCG bearer to the Internet 122, for example, via route 134, using NAT gateway 192, e.g., as described below.

In some demonstrative embodiments, for example, if the offload indication of the SCG bearer of SeNB 102 indicates that offloading traffic of the SCG bearer is allowed, SeNB 102 may send uplink traffic belonging to the SCG bearer to the NAT gateway 192, and/or SeNB 102 may receive downlink traffic for the SCG bearer either from the NAT gateway 192 or from SGW 130, e.g., as described below.

In some demonstrative embodiments, the NAT gateway 192 may be implemented as a gateway, e.g., a dedicated NAT gateway or as part of any other gateway, between SeNB 102 and the Internet 122, e.g., as described below with reference to FIG. 3.

In some demonstrative embodiments, the NAT gateway 192 may be collocated with, and/or implemented as part of, SeNB 102, e.g., as described below with reference to FIG. 4.

In some demonstrative embodiments, system 100 may include a NAT gateway (not shown in FIG. 1), which may be configured to intercept a packet of the SCG bearer of SeNB 102 over S1-U interface 126 between SeNB 102 and SGW 130, and to selectively offload the traffic of the SCG bearer to Internet 122, e.g., as described below with reference to FIG. 5.

Figure 2:
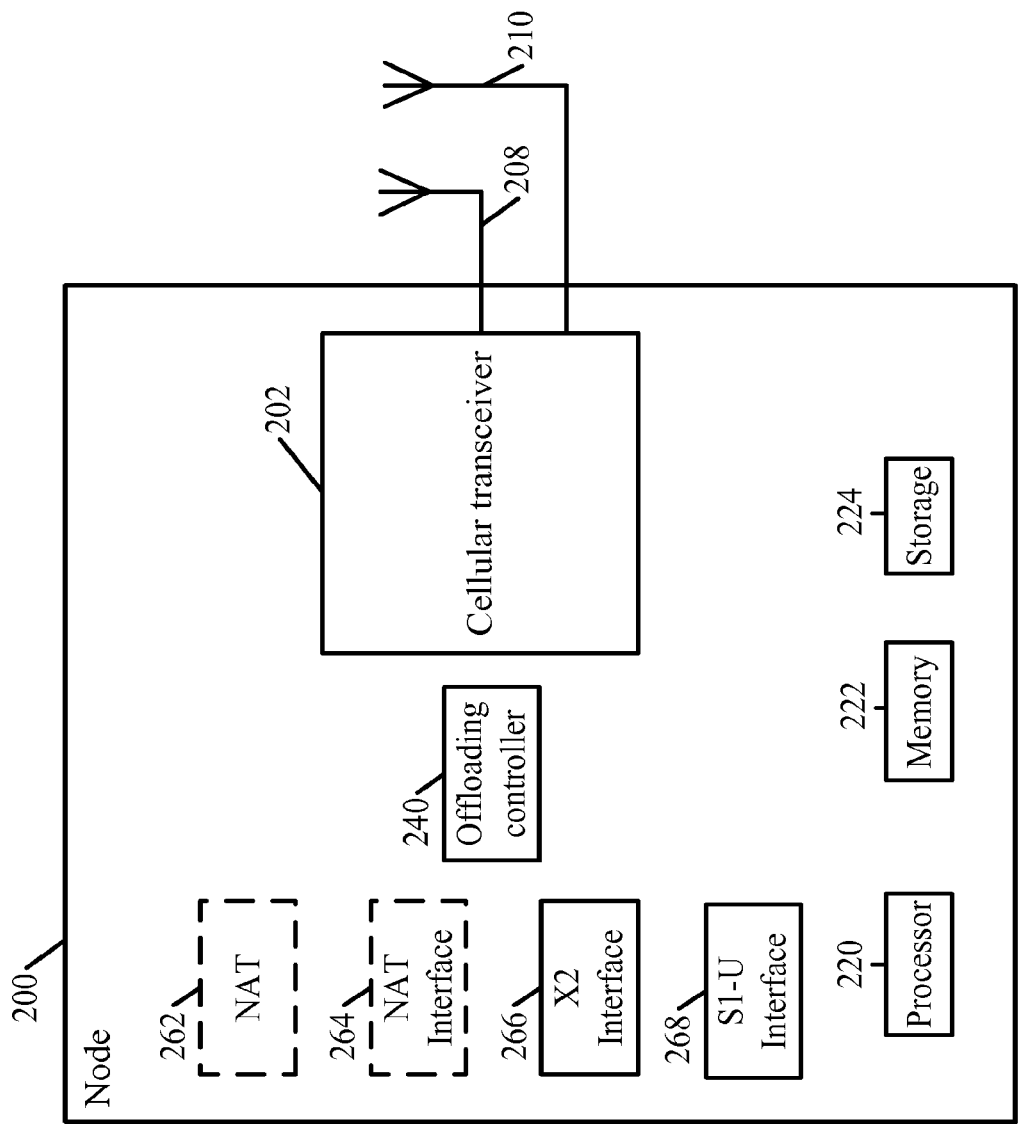
FIG. 2 is a schematic illustration of elements of a node, in accordance with some demonstrative embodiments.

Reference is made to FIG. 2, which schematically illustrates elements of a node 200, in accordance with some demonstrative embodiments.

In some demonstrative embodiments, an eNB operating as a SeNB, e.g., node 102 and/or node 104 (FIG. 1), may include one or more of the elements of node 200, e.g., as described below.

In some demonstrative embodiments, node 200 may include a cellular transceiver (TRx) 202 configured to communicate over a cellular frequency band, for example, a cellular frequency band of a SCG. For example, node 102, and/or node 104 (FIG. 1) may include a cellular TRx 202.

In some demonstrative embodiments, cellular TRx 202 may include one or more wireless transmitters, receivers and/or transceivers including circuitry and/or logic configured to send and/or receive wireless communication signals, RF signals, frames, blocks, transmission streams, packets, messages, data items, and/or data.

In some demonstrative embodiments, cellular TRx 202 may include circuitry, logic, modulation elements, demodulation elements, amplifiers, analog to digital and digital to analog converters, filters, and/or the like.

In some demonstrative embodiments, cellular TRx 202 may include a multiple input multiple output (MIMO) transmitters receivers system (not shown), including circuitry and/or logic configured to perform antenna beamforming methods, if desired. In other embodiments, cellular TRx 202 may include any other transmitters and/or receivers.

In some demonstrative embodiments, cellular TRx 202 may include LTE, WCDMA and/or TD-SCDMA modulator and/or demodulator circuitry (not shown) configured to modulate and/or demodulate signals to be transmitted by, and/or signals received by, node 200.

In some demonstrative embodiments, cellular TRx 202 may include a decoder, e.g., a turbo decoder, and/or an encoder, e.g., a turbo encoder, (not shown) including circuitry and/or logic for encoding and/or decoding data bits into data symbols, if desired. In some demonstrative embodiments, cellular TRx 202 may include OFDM and/or SC-FDMA modulators and/or demodulators (not shown) configured to communicate OFDM signals over downlink (DL) channels, and/or SC-FDMA signals over uplink (UL) channels.

In some demonstrative embodiments, cellular TRx may include, or may be associated with, one or more antennas. In one example, cellular TRx may be associated with at least two antennas, e.g., antennas 208 and 210. In another example, cellular TRx may be associated with one antenna or more than two antennas.

In some demonstrative embodiments, antennas 208 and/or 210 may include any type of antennas suitable for transmitting and/or receiving wireless communication signals, blocks, frames, transmission streams, packets, messages and/or data. For example, antennas 208 and/or 210 may include any suitable configuration, structure and/or arrangement of one or more antenna elements, components, units, assemblies and/or arrays. For example, antennas 208 and/or 210 may include a phased array antenna, a dipole antenna, a single element antenna, a set of switched beam antennas, and/or the like.

In some embodiments, antennas 208 and/or 210 may implement transmit and receive functionalities using separate transmit and receive antenna elements. In some embodiments, antennas 208 and/or 210 may implement transmit and receive functionalities using common and/or integrated transmit/receive elements.

In some demonstrative embodiments, node 200 may include an offloading controller 240 to control one or more offloading functionalities of node 200 and/or to control one or more operations and/or communications performed by node 200, e.g., as described below. For example, node 102, and/or node 104 (FIG. 1) may include controller 240.

In some demonstrative embodiments, offloading controller 240 may include or may be implemented using suitable circuitry and/or logic, e.g., controller circuitry and/or logic, processor circuitry and/or logic, memory circuitry and/or logic, and/or any other circuitry and/or logic, which may be configured to perform at least part of the functionality of offloading controller 240. Additionally or alternatively, one or more functionalities of offloading controller 240 may be implemented by logic, which may be executed by a machine and/or one or more processors, e.g., as described below.

In some demonstrative embodiments, node 200 may include a first interface 266 to communicate with a MeNB. For example, interface 266 may include an X2 interface to communicate with a MeNB via an X2 connection. In one example, node 102 (FIG. 1) may include interface 266 configured to communicate with MeNB 106 (FIG. 1) via X2 connection 108 (FIG. 1); and/or node 104 (FIG. 1) may include interface 266 configured to communicate with MeNB 106 (FIG. 1) via X2 connection 109 (FIG. 1).

In some demonstrative embodiments, node 200 may include a second interface 268 to communicate with a SGW. For example, interface 268 may include an S1-U interface to communicate with a SGW via a S1-U connection. In one example, node 102 (FIG. 1) may include interface 268 configured to communicate with SGW 130 (FIG. 1) via S1-U connection 126 (FIG. 1); and/or node 104 (FIG. 1) may include interface 268 configured to communicate with SGW 130 (FIG. 1) via S1-U connection 126 (FIG. 1).

In some demonstrative embodiments, cellular TRx 202 may be configured to communicate with a UE traffic of a SCG bearer according to a dual connectivity scheme, and interface 268 may be configured to communicate traffic of the SCG bearer with a SGW, e.g., as described below.

In one example, node 102 (FIG. 1) may include cellular TRx 202 to communicate with UE 119 (FIG. 1) traffic of a SCG bearer of SeNB-1 according to a dual connectivity scheme, and node 102 (FIG. 1) may include interface 268 configured to communicate the traffic of the SCG bearer with SGW 130 (FIG. 1) via the S1-U connection 126 (FIG. 1).

In another example, node 104 (FIG. 1) may include cellular TRx 202 to communicate with UE 119 (FIG. 1) traffic of a SCG bearer of SeNB-2 according to a dual connectivity scheme, and node 104 (FIG. 1) may include interface 268 configured to communicate the traffic of the SCG bearer with SGW 130 (FIG. 1) via the S1-U connection 126 (FIG. 1).

In some demonstrative embodiments, offloading controller 240 may be configured to offload the traffic of the SCG bearer to the Internet via a NAT gateway, e.g., as described below. In one example, node 102 (FIG. 1) may include offloading controller 240 configured to offload traffic of the SCG bearer of SeNB-1 to the Internet 122 (FIG. 1) via NAT gateway 192 (FIG. 1); and/or node 104 (FIG. 1) may include offloading controller 240 configured to offload traffic of the SCG bearer of SeNB-2 to the Internet 122 (FIG. 1) via NAT gateway 192 (FIG. 1), e.g., as described below.

In some demonstrative embodiments, node 200 may include a NAT gateway 262, e.g., as described below with reference to FIG. 3. For example, NAT gateway 262 may be configured to operate as, and/or perform the functionality of, NAT gateway 192 (FIG. 1).

In other embodiments, node 200 may include a NAT interface 264 configured to communicate with the NAT gateway, for example NAT gateway 129 (FIG. 1), e.g., as described below with reference to FIG. 4.

In some demonstrative embodiments, offloading controller 240 may be configured to process an uplink Internet Protocol (IP) packet received from a UE, via the SCG bearer according to the dual connectivity scheme. For example, cellular TRx 202 of node 102 (FIG. 1) may receive the uplink IP packet from UE 119 (FIG. 1), e.g., at SeNB 102 (FIG. 1), and offloading controller 240 may process the received uplink IP packet.

In some demonstrative embodiments, offloading controller 240 may be configured to select, based on whether or not the SCG bearer is allowed to be offloaded, between routing the uplink IP packet to a SGW, and routing the uplink IP packet to the Internet via a NAT gateway. For example, based on whether or not the SCG bearer is allowed to be offloaded, offloading controller 240 of node 02 (FIG. 1) may select between routing the uplink IP packet to SGW 130 (FIG. 1), e.g., via S1-U interface 126 (FIG. 1), and routing the uplink IP packet to the Internet 122 (FIG. 1) via NAT gateway 192 (FIG. 1), e.g., via route 134 (FIG. 1).

In some demonstrative embodiments, offloading controller 240 may be configured to select whether or not to offload the SCG bearer to the Internet based, for example, on an offload indication from a MeNB.

For example, node 102 (FIG. 1) may be configured to receive from MeNB 106 (FIG. 1) an offload indication, e.g., via interface 266. The offload indication may indicate, for example, whether or not the SCG bearer of node 102 (FIG. 1) is allowed to be offloaded. According to this example, offloading controller 240 of node 102 (FIG. 1) may be configured to select whether or not to offload the SCG bearer to the Internet 122 (FIG. 1), e.g., via route 134 (FIG. 1), for example, based on the offload indication from MeNB 106 (FIG. 1).

In some demonstrative embodiments, at least part of the functionality of offloading controller 240 may be implemented by an integrated circuit, for example, a chip, e.g., a System on Chip (SoC). In one example, the chip or SoC may be configured to perform one or more operations and/or functionalities of cellular transceiver 202, interface 266, interface 268, NAT gateway 262, and/or NAT interface 264. For example, the chip or SoC may include one or more elements of offloading controller 240, and/or one or more elements of cellular transceiver 202, interface 266, interface 268, NAT gateway 262, and/or NAT interface 264. In one example, offloading controller 240, cellular transceiver 202, interface 266, interface 268 and NAT gateway 262 may be implemented as part of the chip or SoC. In another example, offloading controller 240, cellular transceiver 202, interface 266, interface 268 and NAT interface 264 may be implemented as part of the chip or SoC.

In other embodiments, offloading controller 240, cellular transceiver 202, interface 266, interface 268 and/or NAT gateway 262 may be implemented by one or more additional or alternative elements of node 200.

In some demonstrative embodiments, node 200 may include, for example, one or more of a processor 220, a memory unit 222, and/or a storage unit 224. In one example, one or more of processor 220, memory 222 and/or storage 224 may be implemented as one or more elements separate from cellular transceiver 202, interface 266, interface 268, NAT gateway 262, and/or NAT interface 264. In another example, one or more of processor 220, memory 222 and/or storage 224 may be implemented as part of cellular transceiver 202, interface 266, interface 268, NAT gateway 262, and/or NAT interface 264.

In some demonstrative embodiments, processor 220 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 220 executes instructions, for example, of an Operating System (OS) of node 200 and/or of one or more suitable applications.

In some demonstrative embodiments, memory unit 222 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 224 includes, for example, a hard disk drive, a floppy disk drive, a Compact Disk (CD) drive, a CD-ROM drive, a DVD drive, or other suitable removable or non-removable storage units. Memory unit 222 and/or storage unit 224, for example, may store data processed by node 200.

Figure 3:
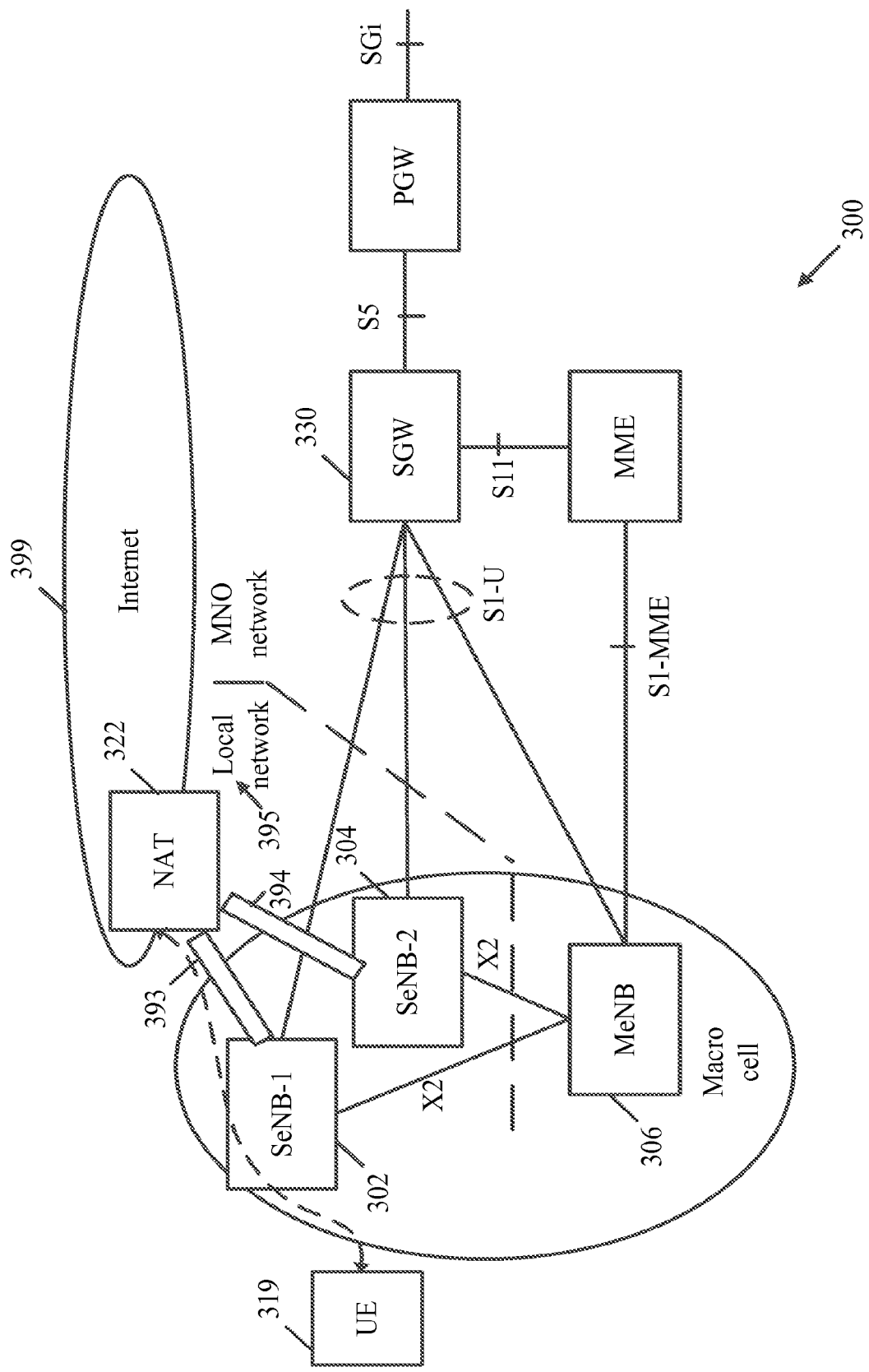
FIG. 3 is a schematic illustration of a system including a Network Address Translation (NAT) gateway to offload traffic from at least one Secondary Evolved Node B (SeNB), in accordance with some demonstrative embodiments.

Reference is made to FIG. 3, which schematically illustrates a system 300 including a NAT gateway 392 to offload traffic from at least one SeNB, in accordance with some demonstrative embodiments. For example, NAT gateway 392 may be configured to operate as, and/or perform one or more functionalities of NAT gateway 192 (FIG. 1).

In some demonstrative embodiments, NAT gateway 392 may be configured to communicate with the Internet 322, for example, using a NAT gateway IP address, which may include an externally routable network address, which may be configured to uniquely identify NAT gateway 392, e.g., on the Internet 322.

In some demonstrative embodiments, NAT gateway 392 may be connected to at least a first SeNB 302 and/or a second SeNB 304, for example, on a backhaul path between a local network 395 and the Internet 322. For example, SeNB 302 may operate as, and/or perform the functionality of, SeNB 102 (FIG. 1), SeNB 304 may operate as, and/or perform the functionality of, SeNB 104 (FIG. 1), and/or local network 395 may perform the functionality of local network 195 (FIG. 1).

In some demonstrative embodiments, SeNB 302 and/or SeNB 304 may include interface 266 (FIG. 2) configured to communicate with a MeNB 306; a cellular transceiver 202 (FIG. 2) to communicate with a UE 319 traffic of a SCG bearer according to a dual connectivity scheme; and an interface 268 (FIG. 2) to communicate the traffic of the SCG bearer with a SGW 330, e.g., as described above.

In some demonstrative embodiments, SeNB 302 may be configured to forward uplink IP packets of the SCG bearer of SeNB 302 to NAT gateway 392, for example, if the SCG bearer is allowed to be offloaded; and/or SeNB 304 may be configured to forward uplink IP packets of the SCG bearer of SeNB 304 to NAT gateway 392, for example, if the SCG bearer is allowed to be offloaded, e.g., as described below.

In some demonstrative embodiments, SeNB 302 and/or SeNB 304 may include offloading controller 240 (FIG. 2) to offload the traffic of the SCG bearer to the Internet 322 via NAT gateway 392, e.g., as described below.

In some demonstrative embodiments, SeNB 302 and/or SeNB 304 may be configured to send uplink IP packets from SCG bearers marked as offloadable to NAT gateway 329, for example, instead of sending the uplink IP packets to SGW 330, e.g., as described below.

In some demonstrative embodiments, SeNB 302 may be configured to receive an uplink IP from UE 319, e.g., via cellular transceiver 202 (FIG. 2), and offloading controller 240 (FIG. 2) of SeNB 302 may be configured to send the uplink IP packet to NAT gateway 395 via a tunnel 393 between SeNB 302 and NAT gateway 392, for example, if the SCG bearer carrying the uplink IP packet is allowed to be offloaded.

In some demonstrative embodiments, SeNB 304 may be configured to receive an uplink IP packet from UE 319, e.g., via cellular transceiver 202 (FIG. 2), and offloading controller 240 (FIG. 2) of SeNB 304 may be configured to send the uplink IP packet to NAT gateway 395 via a tunnel 394 between SeNB 304 and NAT gateway 392, for example, if the SCG bearer carrying the uplink IP packet is allowed to be offloaded.

In some demonstrative embodiments, tunnels 393 and/or 394 may be pre-established between SeNBs 302 and/or 304 and MeNB 306. In one example, tunnels 393 and/or 394 may include an IP tunnel, which may utilize any IP tunneling protocol and/or scheme, and/or any other tunnel.

In some demonstrative embodiments, SeNB 302 may establish tunnel 393 with NAT gateway 392, for example, using the NAT gateway IP address of NAT gateway 392, which may be, for example, pre-configured at SeNB 302, e.g., using an Operations, administration and management (OAM) procedure; and/or SeNB 304 may establish tunnel 394 with NAT gateway 392, for example, using the NAT gateway IP address of NAT gateway 392, which may be, for example, pre-configured at SeNB 304, e.g., using the OAM procedure.

In some demonstrative embodiments, NAT gateway 392 may be configured to perform NAT functionality, for example, to communicate traffic of the offloaded SCG bearers with the Internet 322, e.g., directly, for example, while bypassing the core network, e.g., as described below.

In some demonstrative embodiments, the uplink IP packet from UE 319 may include IP address information corresponding to UE 319. The IP address information, may include, for example, at least a source IP address, or a network prefix, and/or any other IP address information corresponding to UE 319, e.g., as described below.

In some demonstrative embodiments, NAT gateway 392 may be configured to convert the IP address information included in the uplink IP packet into an externally routable IP address, e.g., using the IP address assigned to NAT gateway 392, as described below.

In some demonstrative embodiments, NAT gateway 392 may be configured, for example, to change a source IP address, and, optionally, also a port number, of the uplink IP packet form UE 319, into the IP address of NAT gateway 392, for example, if the uplink IP packet includes an IP Version 4 (IPv4) packet.

In some demonstrative embodiments, NAT gateway 392 may be configured, for example, to change a source network prefix of the uplink IP packet, into the IP address of NAT gateway 392, for example, if the uplink IP packet includes an IP Version 6 (IPv6) packet.

In some demonstrative embodiments, NAT gateway 392 may be configured to map between a tunnel, from which an uplink IP packet is received, and the IP address information included in the uplink IP packet. For example, NAT gateway 392 may be configured to map between tunnel 393 and IP address information included in an uplink IP packet received via tunnel 393.

In some demonstrative embodiments, NAT gateway 392 may maintain mapping information to map between a port number, and a source IP address and/or a network prefix of uplink IP packets received via tunnels 393 and/or 394. Additionally or alternatively, NAT gateway 392 may be configured to implement a stateless algorithmic mapping between local and externally routable prefixes, for example, in accordance with Internet Engineering Task Force (IETF) Request for Comments (RFC) 6296 (ISSN 2070-1721, June 2011) and/or any other mapping, e.g., if the uplink IP packets include IPV6 packets.

In some demonstrative embodiments, NAT gateway 392 may maintain mapping information to associate between a tunnel through which uplink IP packets were last received and a specific source IP address/port or source IP prefix, e.g., which may be included in the uplink IP packets.

In some demonstrative embodiments, NAT gateway 392 may be configured to use the mapping information, for example, to route downlink packets, for example, when UE 319 moves from one SeNB to another, e.g., from SeNB 302 to SeNB 304.

In some demonstrative embodiments, NAT gateway 392 may be configured to forward the IP packets to the Internet 322, e.g., via the Internet connection of local network 395.

In some demonstrative embodiments, NAT gateway 392 may be configured to route downlink traffic received from Internet 322 via tunnels 393 and/or 394, for example, based on the mapping information associated with tunnels 393 and 394, e.g., as described below.

In some demonstrative embodiments, NAT gateway 392 may be configured to receive a downlink IP packet form the Internet 322 to be provided to UE 319. The downlink IP address may include, for example, the IP address of NAT gateway 392.

In some demonstrative embodiments, NAT gateway 392 may be configured to replace the target IP address and port number of the downlink IP packet received from the Internet 322 with a target IP address and port address corresponding to UE 319, e.g., based on the mapping information, for example, if the downlink IP packet is an IPv4 packet.

In some demonstrative embodiments, NAT gateway 392 may be configured to replace the network prefix of the downlink IP packet received from the Internet 322 with a network prefix corresponding to UE 319, e.g., based on the mapping information, for example, if the downlink IP packet is an IPv6 packet.

In some demonstrative embodiments, NAT gateway 392 may be configured to determine whether to route the downlink IP packet via tunnel 393 or tunnel 394, e.g., based on the mapping information, to assign to the downlink IP packet the IP address information corresponding to UE 319, and to send the downlink IP packet to SeNB 302 or SeNB 304, e.g., via tunnel 393 or via tunnel 394.

In some demonstrative embodiments, a system e.g., system 300, utilizing a NAT gateway, e.g., NAT gateway 392, configured to communicate with a plurality of SeNBs via a plurality of tunnels, may enable for example, to support IP prefix preservation, for example, in cases when UE 319 is to move from a first SeNB to a second SeNB, for example, when the first and second SeNBs use a different globally routable set of IP prefixes.

Figure 4:
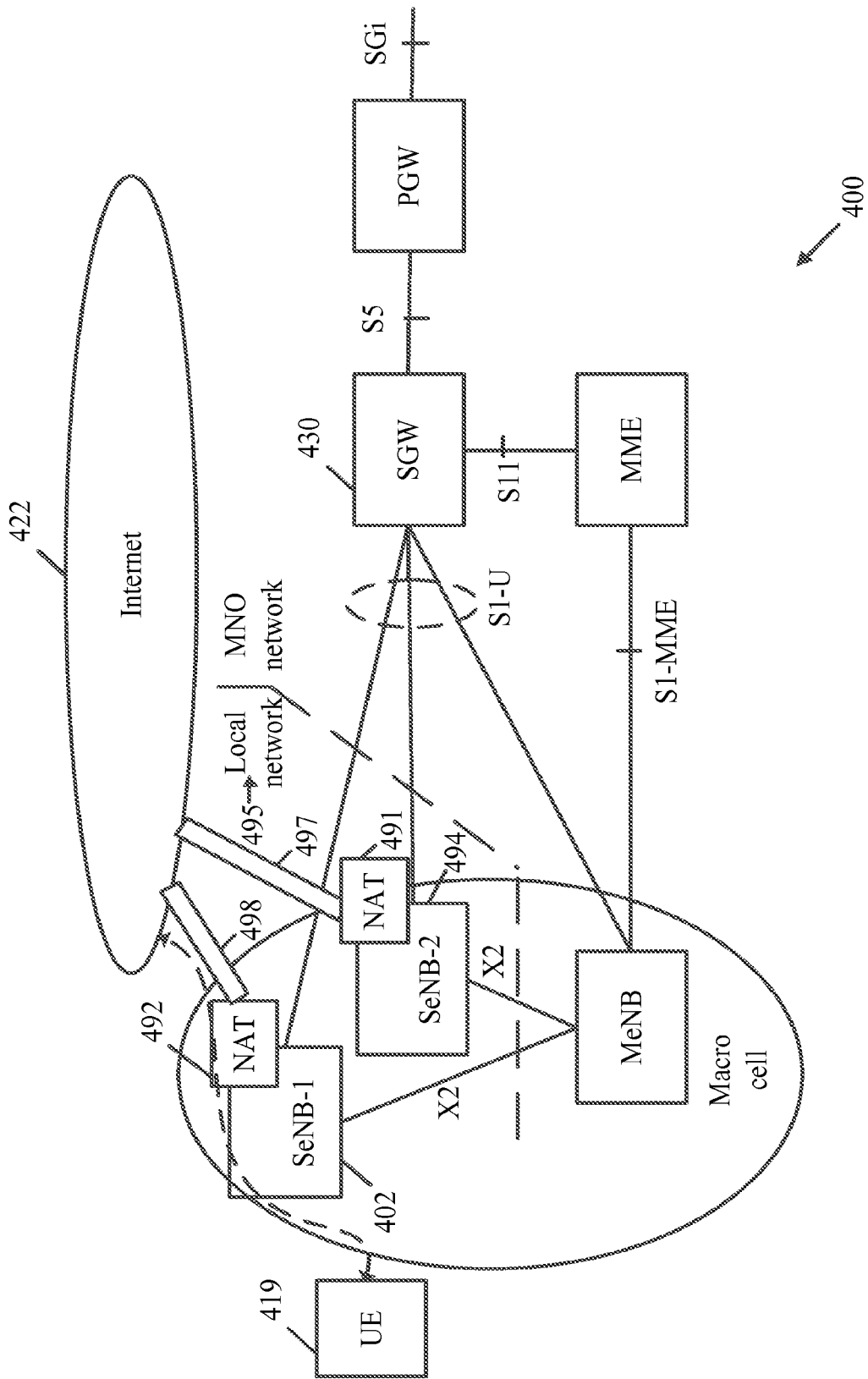
FIG. 4 is a schematic illustration of a system including a NAT gateway collocated with a SeNB, in accordance with some demonstrative embodiments.

FIG. 4 is a schematic illustration of a system 400 including a NAT gateway 492 collocated with a SeNB 402 and a NAT gateway 491 collocated with a SeNB 404, in accordance with some demonstrative embodiments. For example, NAT gateway 492 and/or NAT gateway 491 may be configured to operate as, and/or perform one or more functionalities of NAT gateway 192 (FIG. 1). For example, SeNB 402 may operate as, and/or perform the functionality of, SeNB 102 (FIG. 1), and/or SeNB 404 may operate as, and/or perform the functionality of, SeNB 104 (FIG. 1).

In some demonstrative embodiments, NAT gateway 492 and/or NAT gateway 491 may be connected to the Internet 422, for example, via a local network 495, in which SeNB 402 and/or SeNB 404 may be deployed.

In some demonstrative embodiments, NAT gateway 492 may be configured to communicate with the Internet 422, e.g., via a direct access connection 498, for example, using a NAT gateway IP address, which may include an externally routable network address, which may be configured to uniquely identify NAT gateway 492, e.g., on the Internet 422.

In some demonstrative embodiments, NAT gateway 491 may be configured to communicate with the Internet 422, e.g., via a direct access connection 497, for example, using a NAT gateway IP address, which may include an externally routable network address, which may be configured to uniquely identify NAT gateway 491, e.g., on the Internet 422.

In some demonstrative embodiments, SeNB 402 may include NAT gateway 492, e.g., implemented as NAT gateway 262 (FIG. 2); and/or SeNB 404 may include NAT gateway 491, e.g., implemented as NAT gateway 262 (FIG. 2).

In some demonstrative embodiments, implementing a NAT gateway, e.g., NAT gateway 492 and/or NAT gateway 492, as part of a SeNB, e.g., SeNB 402 and/or SeNB 404, may enable using the NAT gateway, e.g., even without a pre-established tunnel between the SeNB and the NAT gateway.

In some demonstrative embodiments, SeNB 402 and/or SeNB 404 may include a cellular transceiver 202 (FIG. 2) to communicate with a UE 419 traffic of a SCG bearer according to a dual connectivity scheme; and an interface 268 (FIG. 2) to communicate the traffic of the SCG bearer with a SGW 430, e.g., as described above.

In some demonstrative embodiments, SeNB 402 may include offloading controller 240 (FIG. 2) configured to forward uplink IP packets of the SCG bearer of SeNB 402 to the Internet 422, e.g., via collocated NAT gateway 492, for example, if the SCG bearer is allowed to be offloaded; and/or SeNB 404 may include offloading controller 240 (FIG. 2) configured to forward uplink IP packets of the SCG bearer of SeNB 404 to the Internet 422, e.g., via collocated NAT gateway 491, for example, if the SCG bearer is allowed to be offloaded, e.g., as described below.

In some demonstrative embodiments, SeNB 402 and/or SeNB 404 may be configured to send uplink IP packets from SCG bearers marked as offloadable to the Internet 422, for example, instead of sending the uplink IP packets to SGW 430, for example, encapsulated in general packet radio service (GPRS) Tunneling Protocol User Plane (GTP-U) packets.

In some demonstrative embodiments, the uplink IP packet from UE 419 may include IP address information corresponding to UE 419. The IP address information, may include, for example, at least a source IP address, or a network prefix, and/or any other IP address information corresponding to UE 419, e.g., as described below.

In some demonstrative embodiments, offloading controller 240 (FIG. 2) of SeNB 402 and/or NAT gateway 492 may be configured to convert the IP address information included in the uplink IP packet into an externally routable IP address, e.g., using the IP address assigned to NAT gateway 492, as described below.

In some demonstrative embodiments, offloading controller 240 (FIG. 2) of SeNB 402 and/or NAT gateway 492 may be configured, for example, to change a source IP address, and, optionally, also a port number, of the uplink IP packet form UE 419, into the IP address of NAT gateway 492, for example, if the uplink IP packet includes an IP Version 4 (IPv4) packet.

In some demonstrative embodiments, offloading controller 240 (FIG. 2) of SeNB 402 and/or NAT gateway 492 may be configured, for example, to change a source network prefix of the uplink IP packet, into the IP address of NAT gateway 492, for example, if the uplink IP packet includes an IP Version 6 (IPv6) packet.

In some demonstrative embodiments, offloading controller 240 (FIG. 2) of SeNB 402 and/or NAT gateway 492 may be configured to forward the uplink IP packets to the Internet 422, e.g., via the Internet connection of local network 495.

In some demonstrative embodiments, offloading controller 240 (FIG. 2) of SeNB 402 and/or NAT gateway 492 may be configured to receive a downlink IP packet form the Internet 422 to be provided to UE 419. The downlink IP address may include, for example, the IP address of NAT gateway 492.

In some demonstrative embodiments, offloading controller 240 (FIG. 2) of SeNB 402 and/or NAT gateway 492 may be configured to replace the target IP address and port number of the downlink IP packet received from the Internet 422 with a target IP address and port address corresponding to UE 419, for example, if the downlink IP packet is an IPv4 packet.

In some demonstrative embodiments, offloading controller 240 (FIG. 2) of SeNB 402 and/or NAT gateway 492 may be configured to replace the network prefix of the downlink IP packet received from the Internet 422 with a network prefix corresponding to UE 419, for example, if the downlink IP packet is an IPv6 packet.

Figure 5:
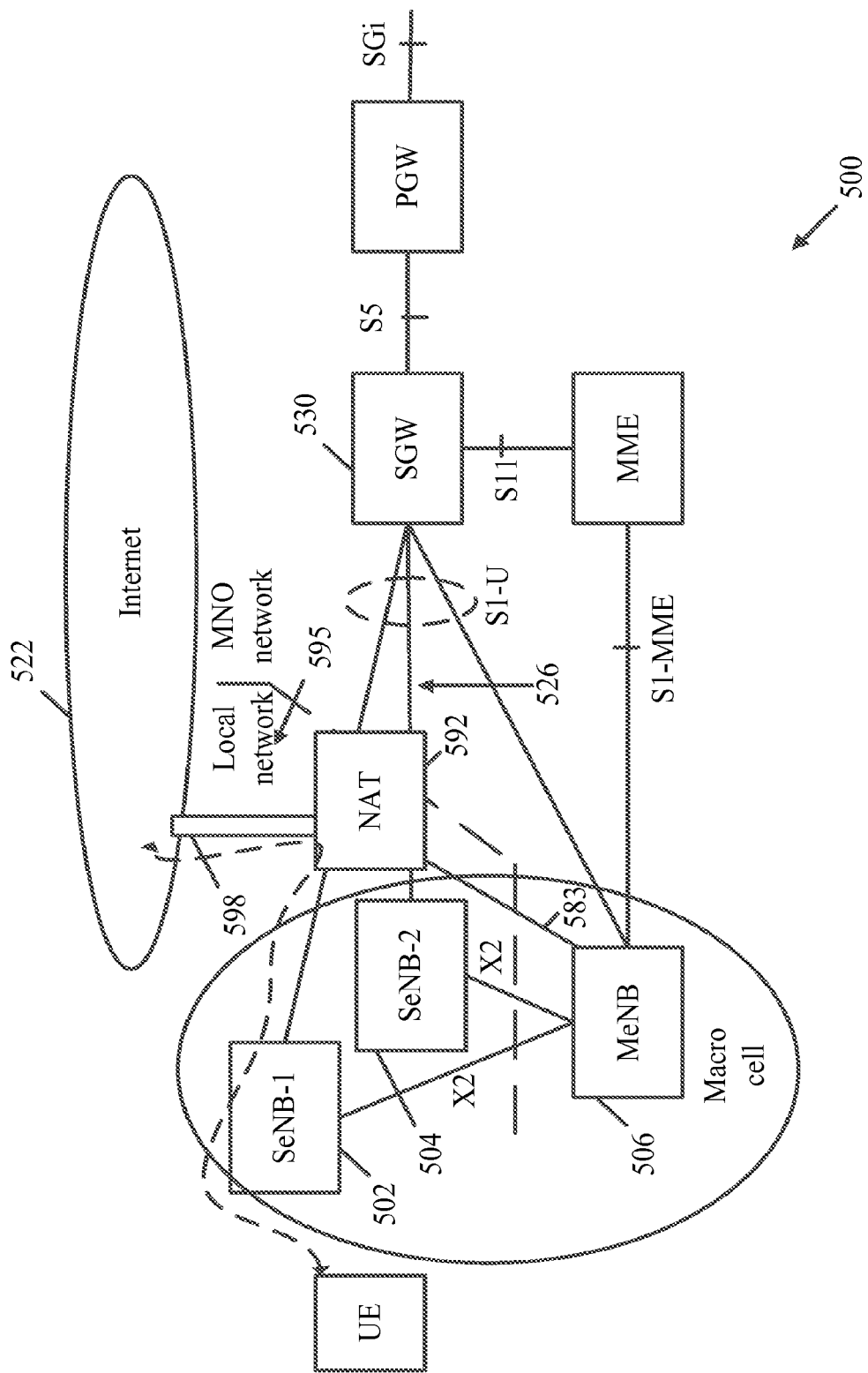
FIG. 5 is a schematic illustration of a system including a NAT gateway to intercept and offload traffic of a SeNB, in accordance with some demonstrative embodiments.

FIG. 5 is a schematic illustration of a system 500 including a NAT gateway 592 to intercept and offload traffic of a SeNB 502 and/or a SeNB 504, in accordance with some demonstrative embodiments. For example, NAT gateway 592 may be configured to operate as, and/or perform one or more functionalities of NAT gateway 192 (FIG. 1). For example, SeNB 502 may operate as, and/or perform the functionality of, SeNB 102 (FIG. 1), and/or SeNB 504 may operate as, and/or perform the functionality of, SeNB 104 (FIG. 1).

In some demonstrative embodiments, NAT gateway 592 may be connected to the Internet 522, for example, via a local network 595, in which SeNB 502 and/or SeNB 504 may be deployed.

In some demonstrative embodiments, NAT gateway 592 may be configured to communicate with the Internet 522, e.g., via a direct access connection 598, for example, using a NAT gateway IP address, which may include an externally routable network address, which may be configured to uniquely identify NAT gateway 592, e.g., on the Internet 522.

In some demonstrative embodiments, NAT gateway 592 may be configured to intercept packets communicated from SeNB 402 and/or SeNB 404 to an SGW 530 over a S1-U interface 526. For example, SGW 530 may perform the functionality of SGW 130 (FIG. 1) and/or S1-U interface 526 may perform the functionality of S1-U interface 126 (FIG. 1).

In some demonstrative embodiments, SeNB 402 and/or SeNB 404 may be configured to encapsulate uplink IP packets from SCG bearers, for example, in a GTP-U header of GTP-U packets, and to forward the encapsulated uplink IP packets to SGW 530 on the S1-U interface 526.

In some demonstrative embodiments, NAT gateway 592 may reside on the S1-U interface 526, and may be configured to intercept all GTP-U packets communicated over S1-U interface 526.

In some demonstrative embodiments, NAT gateway 592 may be configured to inspect the headers of the intercepted GTP-U packets.

In some demonstrative embodiments, NAT gateway 592 may be configured to receive offloading information from a MeNB 506, e.g., via a C-plane interface 583 with the MeNB 506. The offloading information may indicate, for example, which SCG bearers are offloadable to the Internet 522, e.g., as described above.

In some demonstrative embodiments, NAT gateway 592 may be configured to offload uplink IP packets of an SCG bearer to the Internet 522, for example, if the SCG bearer is offloadable. For example, NAT gateway 592 may be configured to decapsulate the GTP-U header of an intercepted GTP-U packet belonging to an offloadable SCG bearer, and to forward the decapsulated IP packets to the Internet 522.

Figure 6:
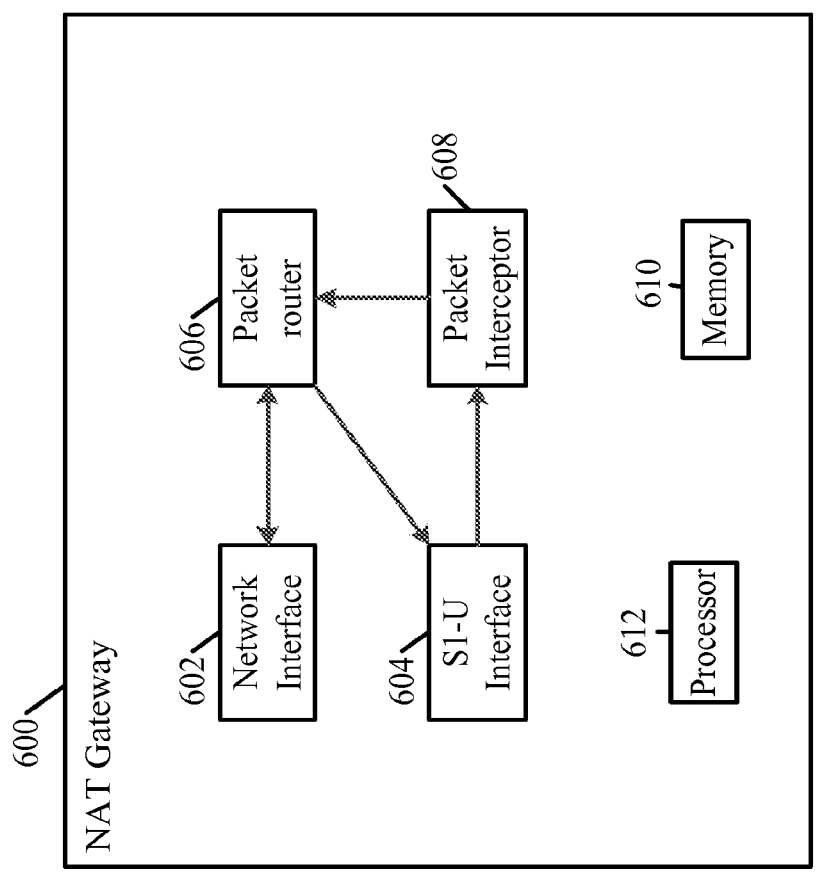
FIG. 6 is a schematic illustration of elements of a NAT gateway, in accordance with some demonstrative embodiments.

In some FIG. 6 is a schematic illustration of elements of a NAT gateway 600, in accordance with some demonstrative embodiments. For example, NAT gateway 600 may be configured to operate as, and/or perform one or more functionalities of NAT gateway 592 (FIG. 5).

In some demonstrative embodiments, NAT gateway 600 may include a network interface 602 to communicate with the Internet, e.g., to communicate with the Internet 522 (FIG. 5) via connection 598 (FIG. 5).

In some demonstrative embodiments, NAT gateway 600 may include an S1-interface 604 including circuitry and/or logic configured to communicate over an S1-U interface, e.g., S1-U interface 526 (FIG. 5).

In some demonstrative embodiments, NAT gateway 600 may include a packet interceptor 608 including circuitry and/or logic configured to intercept an uplink GTP-U packet of a SCG bearer over an interface between a SeNB and a SGW. For example, packet interceptor 608 may be configured to intercept an uplink GTP-U packet of a SCG bearer over interface 526 (FIG. 5) between SGW 530 and SeNB 502 (FIG. 5) and/or SeNB 504, e.g., as described above.

In some demonstrative embodiments, NAT gateway 600 may include a packet router 606 including circuitry and/or logic configured to determine if traffic of the SCG bearer is allowed to be offloaded to the Internet, and if the traffic of the SCG bearer is allowed to be offloaded to the Internet, to decapsulate an uplink IP packet from the uplink GTP-U packet and to forward the uplink IP packet to the Internet. For example, packet router 606 may be configured to determine if traffic of a SCG bearer of SeNB 502 (FIG. 5) is allowed to be offloaded to the Internet 522 (FIG. 5), and if the traffic of the SCG bearer is allowed to be offloaded to the Internet, to decapsulate an uplink IP packet from an uplink GTP-U packet intercepted over S1-U interface 530 (FIG. 5), and to forward the uplink IP packet to the Internet 522, e.g., via connection 598 (FIG. 5).

In some demonstrative embodiments, packet router 606 may be configured to determine if traffic of the SCG bearer is allowed to be offloaded to the Internet based on an offload indication from a MeNB, e.g., MeNB 506 (FIG. 5), as described above.

In some demonstrative embodiments, packet router 606 may be configured to receive a downlink IP packet form the Internet, e.g., via network interface 603, to encapsulate the downlink IP packet in a downlink GTP-U packet, and to forward the downlink GTP-U packet to the SeNB, e.g., via S1-U interface 604.

In some demonstrative embodiments, NAT gateway 600 may include, for example, a processor 612 and/or a memory 610. In one example, processor 612 and/or memory 610 may be implemented as one or more elements separate from packet router 606, packet interceptor 608, network interface 602 and/or S1-U interface 604. In another example, processor 612 and/or memory 610 may be implemented as part of packet router 606, packet interceptor 608, network interface 602 and/or S1-U interface 604.

In some demonstrative embodiments, processor 612 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 612 executes instructions, for example, of an Operating System (OS) of NAT gateway 600 and/or of one or more suitable applications.

In some demonstrative embodiments, memory 610 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Memory 610, for example, may store data processed by NAT gateway 600.

Figure 7:
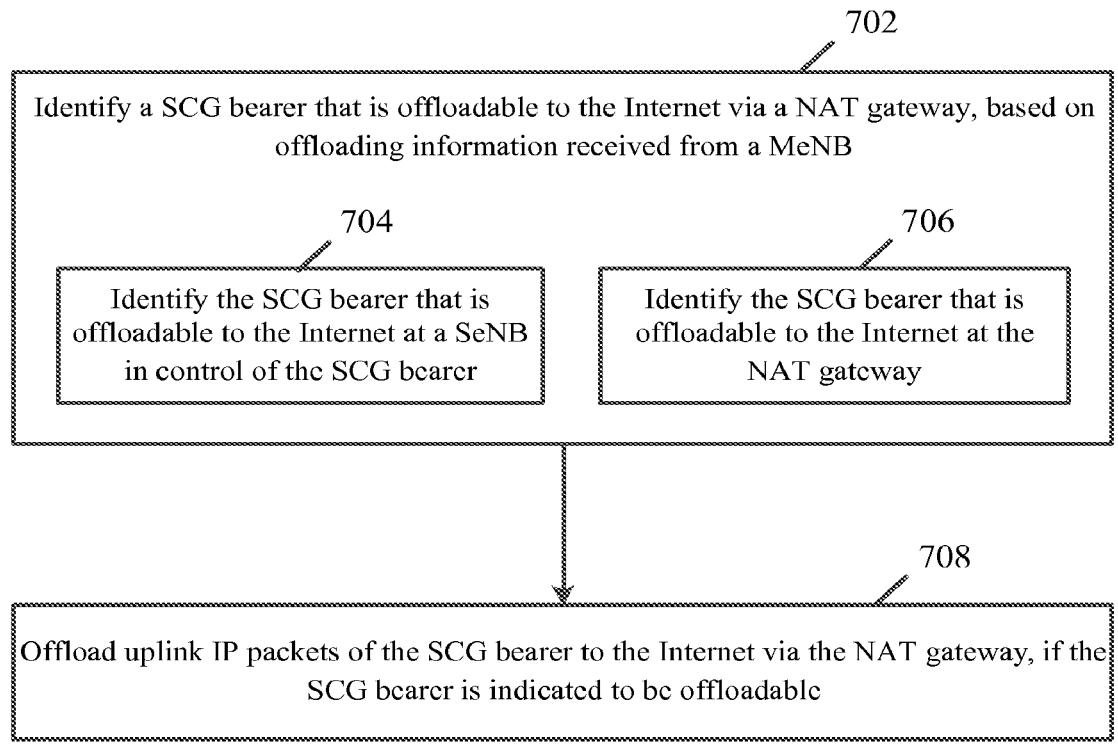
FIG. 7 is a schematic flow-chart illustration of a method of offloading traffic of a Secondary Cell Group (SCO), in accordance with some demonstrative embodiments.

FIG. 7 is a schematic flow-chart illustration of a method of offloading traffic of a SCG, in accordance with some demonstrative embodiments. In some embodiments, one or more of the operations of the method of FIG. 7 may be performed by one or more elements of a system, e.g., system 100 (FIG. 1), system 300 (FIG. 3), system 400 (FIG. 4), and/or system 500 (FIG. 5); a node, e.g., node 102 (FIG. 1), node 104 (FIG. 1), and/or node 200 (FIG. 2); a SeNB, e.g., SeNB 302 (FIG. 3), SeNB 304 (FIG. 3), SeNB 402 (FIG. 4), and/or SeNB 404 (FIG. 4); a NAT gateway, e.g., NAT gateway 192 (FIG. 1), NAT gateway 262 (FIG. 2), NAT gateway 392 (FIG. 3), NAT gateway 492 (FIG. 4), NAT gateway 491 (FIG. 4), NAT gateway 592 (FIG. 5), and/or NAT gateway 600 (FIG. 6); an offloading controller, e.g., offloading controller 240 (FIG. 2); and/or a packet router, e.g., packet router 606 (FIG. 6).

As indicated at block 702, the method may include identifying a SCG bearer that is offloadable to the Internet via a NAT gateway, based on offloading information received from a MeNB.

As indicated at block 704, the method may include identifying the SCG bearer that is offloadable to the Internet at a SeNB in control of the SCG bearer. For example, SeNB 102 (FIG. 1) may be configured to identify a SCG bearer controller by SeNB 102 (FIG. 1) that is offloadable to the Internet via NAT gateway 192 (FIG. 1), e.g., as described above.

As indicated at block 706, the method may include identifying the SCG bearer that is offloadable to the Internet at the NAT gateway. For example, NAT gateway 592 (FIG. 5) may be configured to identify a SCG bearer controller by SeNB 502 (FIG. 1) that is offloadable to the Internet via NAT gateway 592 (FIG. 1), e.g., as described above.

As indicated at block 708, the method may include offloading uplink IP packets of the SCG bearer to the Internet via the NAT gateway, if the SCG bearer is indicated to be offloadable. In one example, SeNB 102 (FIG. 1) may offload uplink IP packets of the SCG bearer controlled by SeNB 102 (FIG. 1) to the Internet via NAT gateway 192 (FIG. 1), e.g., as described above. In another example, NAT gateway 592 (FIG. 5) may offload uplink IP packets of the SCG bearer controlled by SeNB 502 (FIG. 5) to the Internet, e.g., as described above.

Figure 8:
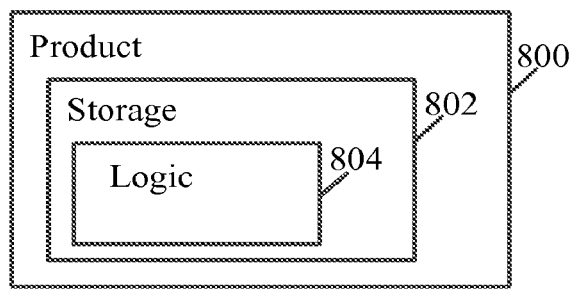
FIG. 8 is a schematic illustration of a product, in accordance with some demonstrative embodiments.

Reference is made to FIG. 8, which schematically illustrates a product of manufacture 800, in accordance with some demonstrative embodiments. Product 800 may include a non-transitory machine-readable storage medium 802 to store logic 804, which may be used, for example, to perform at least part of the functionality of a node, e.g., node 102 (FIG. 1), node 104 (FIG. 1), and/or node 200 (FIG. 2); a SeNB, e.g., SeNB 302 (FIG. 3), SeNB 304 (FIG. 3), SeNB 402 (FIG. 4), and/or SeNB 404 (FIG. 4); a NAT gateway, e.g., NAT gateway 192 (FIG. 1), NAT gateway 262 (FIG. 2), NAT gateway 392 (FIG. 3), NAT gateway 492 (FIG. 4), NAT gateway 401 (FIG. 4), NAT gateway 592 (FIG. 5), and/or NAT gateway 600 (FIG. 6); an offloading controller, e.g., offloading controller 240 (FIG. 2); and/or a packet router, e.g., packet router 606 (FIG. 6); and/or to perform one or more operations discussed above, e.g., including one or more operations discussed with reference to FIG. 7. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an Evolved Node B (eNB) configured to operate as a Secondary eNB (SeNB), the eNB comprising a first interface configured to communicate with a Master eNB (MeNB); a cellular transceiver configured to communicate with a User Equipment (UE) traffic of a Secondary Cell Group (SCG) bearer according to a dual connectivity scheme; a second interface to communicate the traffic of the SCG bearer with a Serving Gateway (SGW); and an offloading controller configured to offload the traffic of the SCG bearer to the Internet via a Network Address Translation (NAT) gateway.

Example 2 includes the subject matter of Example 1, and optionally, wherein the offloading controller is configured to select whether or not to offload the SCG bearer to the Internet based on an offload indication received from the MeNB, the offload indication to indicate whether or not the SCG bearer is allowed to be offloaded.

Example 3 includes the subject matter of Example 1 or 2, and optionally, wherein the cellular transceiver is to receive from the UE an uplink Internet Protocol (IP) packet, the offloading controller to send the uplink IP packet to the NAT gateway via a tunnel between the eNB and the NAT gateway.

Example 4 includes the subject matter of Example 1 or 2, and optionally, comprising the NAT gateway.

Example 5 includes the subject matter of Example 4, and optionally, wherein the cellular transceiver is to receive from the UE an uplink Internet Protocol (IP) packet comprising IP address information corresponding to the UE, the NAT gateway is configured to convert the IP address information into an IP address assigned to the NAT gateway.

Example 6 includes the subject matter of Example 5, and optionally, wherein the NAT gateway is to receive a downlink Internet Protocol (IP) packet form the Internet, the NAT gateway is configured to assign to the downlink IP packet the IP address information corresponding to the UE.

Example 7 includes the subject matter of Example 5 or 6, and optionally, wherein the IP address information corresponding to the UE comprises a source IP address, or a network prefix.

Example 8 includes the subject matter of any one of Examples 1-7, and optionally, comprising one or more antennas, a memory and a processor.

Example 9 includes a Network Address Translation (NAT) gateway comprising a network interface to communicate with the Internet; a packet interceptor to intercept an uplink general packet radio service (GPRS) Tunneling Protocol User Plane (GTP-U) packet of a Secondary Cell Group (SCG) bearer over an interface between a Secondary evolved Node B (SeNB) and a Serving Gateway (SGW); and a packet router to determine if traffic of the SCG bearer is allowed to be offloaded to the Internet, and if the traffic of the SCG bearer is allowed to be offloaded to the Internet, to decapsulate an uplink Internet Protocol (IP) packet from the uplink GTP-U packet and to forward the uplink IP packet to the Internet.

Example 10 includes the subject matter of Example 9, and optionally, wherein the packet router is configured to determine if traffic of the SCG bearer is allowed to be offloaded to the Internet based on an offload indication from a Master evolved Node B (MeNB).

Example 11 includes the subject matter of Example 9 or 10, and optionally, wherein the network interface is to receive a downlink Internet Protocol (IP) packet form the Internet, the packet router is configured to encapsulate the downlink IP packet in a downlink GTP-U packet, and to forward the downlink GTP-U packet to the SeNB.

Example 12 includes the subject matter of any one of Examples 9-11, and optionally, wherein the packet interceptor is to intercept the uplink GTP-U packet over an S1-U interface.

Example 13 includes the subject matter of any one of Examples 9-12, and optionally, comprising a memory and a processor.

Example 14 includes an Evolved Node B (eNB) configured to operate as a Secondary eNB (SeNB), the eNB comprising a cellular transceiver configured to receive an uplink Internet Protocol (IP) packet from a User Equipment (UE) via a Secondary Cell Group (SCG) bearer according to a dual connectivity scheme; and a controller configured to, based on whether or not the SCG bearer is allowed to be offloaded, select between routing the uplink IP packet to a Serving Gateway (SGW), and routing the uplink IP packet to the Internet via a Network Address Translation (NAT) gateway.

Example 15 includes the subject matter of Example 14, and optionally, wherein the controller is configured to determine if traffic of the SCG bearer is allowed to be offloaded to the Internet based on an offload indication from a Master evolved Node B (MeNB).

Example 16 includes the subject matter of Example 14 or 15, and optionally, wherein the controller is configured to route the uplink IP packet to the NAT gateway via a tunnel between the SeNB and the NAT gateway.

Example 17 includes the subject matter of Example 14 or 15, and optionally, comprising the NAT gateway.

Example 18 includes the subject matter of Example 17, and optionally, wherein the uplink IP packet comprises IP address information corresponding to the UE, the controller is configured to convert the IP address information into an IP address assigned to the NAT.

Example 19 includes the subject matter of Example 18, and optionally, wherein the controller is configured to, upon receipt of a downlink Internet Protocol (IP) packet form the Internet, assign to the downlink IP packet the IP address information corresponding to the UE.

Example 20 includes the subject matter of Example 18 or 19, and optionally, wherein the IP address information corresponding to the UE comprises a source IP address, or a network prefix.

Example 21 includes the subject matter of any one of Examples 14-20, and optionally, comprising one or more antennas, a memory and a processor.

Example 22 includes an apparatus comprising circuitry configured to cause a Secondary Evolved Node B (SeNB), which is to communicate with a Master eNB (MeNB), to communicate with a User Equipment (UE) traffic of a Secondary Cell Group (SCG) bearer according to a dual connectivity scheme; communicate the traffic of the SCG bearer with a Serving Gateway (SGW); and offload the traffic of the SCG bearer to the Internet via a Network Address Translation (NAT) gateway.

Example 23 includes the subject matter of Example 22, and optionally, wherein the apparatus is configured to cause the SeNB to select whether or not to offload the SCG bearer to the Internet based on an offload indication received from the MeNB, the offload indication to indicate whether or not the SCG bearer is allowed to be offloaded.

Example 24 includes the subject matter of Example 22 or 23, and optionally, wherein the apparatus is configured to cause the SeNB to send to the NAT gateway via a tunnel between the eNB and the NAT gateway an uplink Internet Protocol (IP) packet received from the UE.

Example 25 includes the subject matter of Example 22 or 23, and optionally, wherein the apparatus is configured to cause the SeNB to operate as the NAT gateway.

Example 26 includes the subject matter of Example 25, and optionally, wherein the apparatus is configured to cause the NAT gateway to process an uplink Internet Protocol (IP) packet from the UE comprising IP address information corresponding to the UE, and to convert the IP address information into an IP address assigned to the NAT gateway.

Example 27 includes the subject matter of Example 26, and optionally, wherein the apparatus is configured to cause the NAT gateway to process a downlink Internet Protocol (IP) packet form the Internet, and to assign to the downlink IP packet the IP address information corresponding to the UE.

Example 28 includes the subject matter of Example 26 or 27, and optionally, wherein the IP address information corresponding to the UE comprises a source IP address, or a network prefix.

Example 29 includes the subject matter of any one of Examples 22-28, and optionally, comprising one or more antennas, a memory and a processor.

Example 30 includes an apparatus comprising circuitry configured to cause a Network Address Translation (NAT) gateway to intercept an uplink general packet radio service (GPRS) Tunneling Protocol User Plane (GTP-U) packet of a Secondary Cell Group (SCG) bearer over an interface between a Secondary evolved Node B (SeNB) and a Serving Gateway (SGW); determine if traffic of the SCG bearer is allowed to be offloaded to the Internet; and if the traffic of the SCG bearer is allowed to be offloaded to the Internet, decapsulate an uplink Internet Protocol (IP) packet from the uplink GTP-U packet and forward the uplink IP packet to the Internet.

Example 31 includes the subject matter of Example 30, and optionally, wherein the apparatus is configured to cause the NAT gateway to determine if traffic of the SCG bearer is allowed to be offloaded to the Internet based on an offload indication from a Master evolved Node B (MeNB).

Example 32 includes the subject matter of Example 30 or 31, and optionally, wherein the apparatus is configured to cause the NAT gateway to process a downlink Internet Protocol (IP) packet form the Internet, to encapsulate the downlink IP packet in a downlink GTP-U packet, and to forward the downlink GTP-U packet to the SeNB.

Example 33 includes the subject matter of any one of Examples 30-32, and optionally, wherein the apparatus is configured to cause the NAT gateway to intercept the uplink GTP-U packet over an S1-U interface.

Example 34 includes the subject matter of any one of Examples 30-33, and optionally, comprising a memory and a processor.

Example 35 includes an apparatus comprising circuitry configured to cause a Secondary Evolved Node B (SeNB) to process an uplink Internet Protocol (IP) packet received from a User Equipment (UE) via a Secondary Cell Group (SCG) bearer according to a dual connectivity scheme; and based on whether or not the SCG bearer is allowed to be offloaded, select between routing the uplink IP packet to a Serving Gateway (SGW), and routing the uplink IP packet to the Internet via a Network Address Translation (NAT) gateway.

Example 36 includes the subject matter of Example 35, and optionally, wherein the apparatus is configured to cause the SeNB to determine if traffic of the SCG bearer is allowed to be offloaded to the Internet based on an offload indication from a Master evolved Node B (MeNB).

Example 37 includes the subject matter of Example 35 or 36, and optionally, wherein the apparatus is configured to cause the SeNB to route the uplink IP packet to the NAT gateway via a tunnel between the SeNB and the NAT gateway.

Example 38 includes the subject matter of Example 35 or 36, and optionally, wherein the apparatus is configured to cause the SeNB to operate as the NAT gateway.

Example 39 includes the subject matter of Example 38, and optionally, wherein the uplink IP packet from the UE comprises IP address information corresponding to the UE, the apparatus configured to cause the NAT gateway to convert the IP address information into an IP address assigned to the NAT.

Example 40 includes the subject matter of Example 39, and optionally, wherein the apparatus is configured to cause the NAT gateway to assign the IP address information corresponding to the UE to a downlink Internet Protocol (IP) packet form the Internet.

Example 41 includes the subject matter of Example 39 or 40, and optionally, wherein the IP address information corresponding to the UE comprises a source IP address, or a network prefix.

Example 42 includes the subject matter of any one of Examples 35-41, and optionally, comprising one or more antennas, a memory and a processor.

Example 43 includes a method to be performed by a Secondary Evolved Node B (SeNB), which is to communicate with a Master eNB (MeNB), the method comprising communicating with a User Equipment (UE) traffic of a Secondary Cell Group (SCG) bearer according to a dual connectivity scheme; communicating the traffic of the SCG bearer with a Serving Gateway (SGW); and offloading the traffic of the SCG bearer to the Internet via a Network Address Translation (NAT) gateway.

Example 44 includes the subject matter of Example 43, and optionally, comprising selecting whether or not to offload the SCG bearer to the Internet based on an offload indication received from the MeNB, the offload indication to indicate whether or not the SCG bearer is allowed to be offloaded.

Example 45 includes the subject matter of Example 43 or 44, and optionally, comprising sending to the NAT gateway via a tunnel between the eNB and the NAT gateway an uplink Internet Protocol (IP) packet received from the UE.

Example 46 includes the subject matter of Example 43 or 44, and optionally, comprising processing an uplink Internet Protocol (IP) packet from the UE comprising IP address information corresponding to the UE, and converting the IP address information into an IP address assigned to the NAT gateway.

Example 47 includes the subject matter of Example 46, and optionally, comprising processing a downlink Internet Protocol (IP) packet form the Internet, and assigning to the downlink IP packet the IP address information corresponding to the UE.

Example 48 includes the subject matter of 46 or 47, and optionally, wherein the IP address information corresponding to the UE comprises a source IP address, or a network prefix.

Example 49 includes a method to be performed by a Network Address Translation (NAT) gateway, the method comprising intercepting an uplink general packet radio service (GPRS) Tunneling Protocol User Plane (GTP-U) packet of a Secondary Cell Group (SCG) bearer over an interface between a Secondary evolved Node B (SeNB) and a Serving Gateway (SGW); determining if traffic of the SCG bearer is allowed to be offloaded to the Internet; and if the traffic of the SCG bearer is allowed to be offloaded to the Internet, decapsulating an uplink Internet Protocol (IP) packet from the uplink GTP-U packet and forwarding the uplink IP packet to the Internet.

Example 50 includes the subject matter of Example 49, and optionally, comprising determining if traffic of the SCG bearer is allowed to be offloaded to the Internet based on an offload indication from a Master evolved Node B (MeNB).

Example 51 includes the subject matter of Example 49 or 50, and optionally, comprising processing a downlink Internet Protocol (IP) packet form the Internet, encapsulating the downlink IP packet in a downlink GTP-U packet, and forwarding the downlink GTP-U packet to the SeNB.

Example 52 includes the subject matter of any one of Examples 49-51, and optionally, comprising intercepting the uplink GTP-U packet over an S1-U interface.

Example 53 includes a method to be performed at a Secondary Evolved Node B (SeNB), the method comprising processing an uplink Internet Protocol (IP) packet received from a User Equipment (UE) via a Secondary Cell Group (SCG) bearer according to a dual connectivity scheme; and based on whether or not the SCG bearer is allowed to be offloaded, selecting between routing the uplink IP packet to a Serving Gateway (SGW), and routing the uplink IP packet to the Internet via a Network Address Translation (NAT) gateway.

Example 54 includes the subject matter of Example 53, and optionally, comprising determining if traffic of the SCG bearer is allowed to be offloaded to the Internet based on an offload indication from a Master evolved Node B (MeNB).

Example 55 includes the subject matter of Example 53 or 54, and optionally, comprising routing the uplink IP packet to the NAT gateway via a tunnel between the SeNB and the NAT gateway.

Example 56 includes the subject matter of Example 53 or 54, and optionally, wherein the uplink IP packet from the UE comprises IP address information corresponding to the UE, the method comprising converting the IP address information into an IP address assigned to the NAT.

Example 57 includes the subject matter of Example 56, and optionally, comprising assigning the IP address information corresponding to the UE to a downlink Internet Protocol (IP) packet form the Internet.

Example 58 includes the subject matter of Example 56 or 57, and optionally, wherein the IP address information corresponding to the UE comprises a source IP address, or a network prefix.

Example 59 includes a product comprising one or more tangible computer-readable non-transitory storage media comprising computer-executable instructions operable to, when executed by at least one computer processor, enable the at least one computer processor to implement one or more operations at a Secondary Evolved Node B (SeNB), which is to communicate with a Master eNB (MeNB), the operations comprising communicating with a User Equipment (UE) traffic of a Secondary Cell Group (SCG) bearer according to a dual connectivity scheme; communicating the traffic of the SCG bearer with a Serving Gateway (SGW); and offloading the traffic of the SCG bearer to the Internet via a Network Address Translation (NAT) gateway.

Example 60 includes the subject matter of Example 59, and optionally, wherein the operations comprise selecting whether or not to offload the SCG bearer to the Internet based on an offload indication received from the MeNB, the offload indication to indicate whether or not the SCG bearer is allowed to be offloaded.

Example 61 includes the subject matter of Example 59 or 60, and optionally, wherein the operations comprise sending to the NAT gateway via a tunnel between the eNB and the NAT gateway an uplink Internet Protocol (IP) packet received from the UE.

Example 62 includes the subject matter of Example 59 or 60, and optionally, wherein the operations comprise processing an uplink Internet Protocol (IP) packet from the UE comprising IP address information corresponding to the UE, and converting the IP address information into an IP address assigned to the NAT gateway.

Example 63 includes the subject matter of Example 62, and optionally, wherein the operations comprise processing a downlink Internet Protocol (IP) packet form the Internet, and assigning to the downlink IP packet the IP address information corresponding to the UE.

Example 64 includes the subject matter of 62 or 63, and optionally, wherein the IP address information corresponding to the UE comprises a source IP address, or a network prefix.

Example 65 includes a product comprising one or more tangible computer-readable non-transitory storage media comprising computer-executable instructions operable to, when executed by at least one computer processor, enable the at least one computer processor to implement one or more operations at a Network Address Translation (NAT) gateway, the operations comprising intercepting an uplink general packet radio service (GPRS) Tunneling Protocol User Plane (GTP-U) packet of a Secondary Cell Group (SCG) bearer over an interface between a Secondary evolved Node B (SeNB) and a Serving Gateway (SGW); determining if traffic of the SCG bearer is allowed to be offloaded to the Internet; and if the traffic of the SCG bearer is allowed to be offloaded to the Internet, decapsulating an uplink Internet Protocol (IP) packet from the uplink GTP-U packet and forwarding the uplink IP packet to the Internet.

Example 66 includes the subject matter of Example 65, and optionally, wherein the operations comprise determining if traffic of the SCG bearer is allowed to be offloaded to the Internet based on an offload indication from a Master evolved Node B (MeNB).

Example 67 includes the subject matter of Example 65 or 66, and optionally, wherein the operations comprise processing a downlink Internet Protocol (IP) packet form the Internet, encapsulating the downlink IP packet in a downlink GTP-U packet, and forwarding the downlink GTP-U packet to the SeNB.

Example 68 includes the subject matter of any one of Examples 65-67, and optionally, wherein the operations comprise intercepting the uplink GTP-U packet over an S1-U interface.

Example 69 includes a product comprising one or more tangible computer-readable non-transitory storage media comprising computer-executable instructions operable to, when executed by at least one computer processor, enable the at least one computer processor to implement one or more operations at a Secondary Evolved Node B (SeNB), the operations comprising processing an uplink Internet Protocol (IP) packet received from a User Equipment (UE) via a Secondary Cell Group (SCG) bearer according to a dual connectivity scheme; and based on whether or not the SCG bearer is allowed to be offloaded, selecting between routing the uplink IP packet to a Serving Gateway (SGW), and routing the uplink IP packet to the Internet via a Network Address Translation (NAT) gateway.

Example 70 includes the subject matter of Example 69, and optionally, comprising determining if traffic of the SCG bearer is allowed to be offloaded to the Internet based on an offload indication from a Master evolved Node B (MeNB).

Example 71 includes the subject matter of Example 69 or 70, and optionally, wherein the operations comprise routing the uplink IP packet to the NAT gateway via a tunnel between the SeNB and the NAT gateway.

Example 72 includes the subject matter of Example 69 or 70, and optionally, wherein the uplink IP packet from the UE comprises IP address information corresponding to the UE, the operations comprising converting the IP address information into an IP address assigned to the NAT.

Example 73 includes the subject matter of Example 72, and optionally, wherein the operations comprise assigning the IP address information corresponding to the UE to a downlink Internet Protocol (IP) packet form the Internet.

Example 74 includes the subject matter of Example 72 or 73, and optionally, wherein the IP address information corresponding to the UE comprises a source IP address, or a network prefix.

Example 75 includes an apparatus to perform one or more operations at a Secondary Evolved Node B (SeNB), which is to communicate with a Master eNB (MeNB), the apparatus comprising means for communicating with a User Equipment (UE) traffic of a Secondary Cell Group (SCG) bearer according to a dual connectivity scheme; means for communicating the traffic of the SCG bearer with a Serving Gateway (SGW); and means for offloading the traffic of the SCG bearer to the Internet via a Network Address Translation (NAT) gateway.

Example 76 includes the subject matter of Example 75, and optionally, comprising means for selecting whether or not to offload the SCG bearer to the Internet based on an offload indication received from the MeNB, the offload indication to indicate whether or not the SCG bearer is allowed to be offloaded.

Example 77 includes the subject matter of Example 75 or 76, and optionally, comprising means for sending to the NAT gateway via a tunnel between the eNB and the NAT gateway an uplink Internet Protocol (IP) packet received from the UE.

Example 78 includes the subject matter of Example 75 or 76, and optionally, comprising means for operating as the NAT gateway.

Example 79 includes the subject matter of Example 78, and optionally, comprising means for processing an uplink Internet Protocol (IP) packet from the UE comprising IP address information corresponding to the UE, and converting the IP address information into an IP address assigned to the NAT gateway.

Example 80 includes the subject matter of Example 79, and optionally, comprising means for processing a downlink Internet Protocol (IP) packet form the Internet, and assigning to the downlink IP packet the IP address information corresponding to the UE.

Example 81 includes the subject matter of 79 or 80, and optionally, wherein the IP address information corresponding to the UE comprises a source IP address, or a network prefix.

Example 82 includes an apparatus to perform one or more operations at a Network Address Translation (NAT) gateway, the apparatus comprising means for intercepting an uplink general packet radio service (GPRS) Tunneling Protocol User Plane (GTP-U) packet of a Secondary Cell Group (SCG) bearer over an interface between a Secondary evolved Node B (SeNB) and a Serving Gateway (SGW); means for determining if traffic of the SCG bearer is allowed to be offloaded to the Internet; and means for, if the traffic of the SCG bearer is allowed to be offloaded to the Internet, decapsulating an uplink Internet Protocol (IP) packet from the uplink GTP-U packet and forwarding the uplink IP packet to the Internet.

Example 83 includes the subject matter of Example 82, and optionally, comprising means for determining if traffic of the SCG bearer is allowed to be offloaded to the Internet based on an offload indication from a Master evolved Node B (MeNB).

Example 84 includes the subject matter of Example 82 or 83, and optionally, comprising means for processing a downlink Internet Protocol (IP) packet form the Internet, encapsulating the downlink IP packet in a downlink GTP-U packet, and forwarding the downlink GTP-U packet to the SeNB.

Example 85 includes the subject matter of any one of Examples 82-84, and optionally, comprising means for intercepting the uplink GTP-U packet over an S1-U interface.

Example 86 includes an apparatus to perform one or more operations at a Secondary Evolved Node B (SeNB), the apparatus comprising means for processing an uplink Internet Protocol (IP) packet received from a User Equipment (UE) via a Secondary Cell Group (SCG) bearer according to a dual connectivity scheme; and means for, based on whether or not the SCG bearer is allowed to be offloaded, selecting between routing the uplink IP packet to a Serving Gateway (SGW), and routing the uplink IP packet to the Internet via a Network Address Translation (NAT) gateway.

Example 87 includes the subject matter of Example 86, and optionally, comprising means for determining if traffic of the SCG bearer is allowed to be offloaded to the Internet based on an offload indication from a Master evolved Node B (MeNB).

Example 88 includes the subject matter of Example 86 or 87, and optionally, comprising means for routing the uplink IP packet to the NAT gateway via a tunnel between the SeNB and the NAT gateway.

Example 89 includes the subject matter of Example 86 or 87, and optionally, comprising means for performing operations of the NAT gateway.

Example 90 includes the subject matter of Example 89, and optionally, wherein the uplink IP packet from the UE comprises IP address information corresponding to the UE, the apparatus comprising means for converting the IP address information into an IP address assigned to the NAT.

Example 91 includes the subject matter of Example 90, and optionally, comprising means for assigning the IP address information corresponding to the UE to a downlink Internet Protocol (IP) packet form the Internet.

Example 92 includes the subject matter of Example 90 or 91, and optionally, wherein the IP address information corresponding to the UE comprises a source IP address, or a network prefix.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A Master eNB (MeNB) comprising:
   a processor configured to generate an offload indication indicating whether or not a Secondary eNB (SeNB) can offload traffic of a Secondary Cell Group (SCG) bearer of an SCG to the Internet; and
   a cellular transceiver, coupled to the processor, configured to transmit the offload indication to the SCG.

2. The MeNB of claim 1, wherein the cellular transceiver transmits the offload indication to the SCG via an X2 connection.

3. The MeNB of claim 2, wherein the X2 connection is configured to communicate both Control Plane (C-plane) and User Plane (U-plane) traffic.

4. The MeNB of claim 1, wherein the cellular transceiver is further coupled to a Mobility Management Entity (MME).

5. The MeNB of claim 4, wherein the cellular transceiver is further configured to receive an offload information corresponding to the SeNB from the MME.

6. The MeNB of claim 5, wherein the offload information is received via an Information Element (IE) message.

7. The MeNB of claim 4, wherein the cellular transceiver is coupled to the MME via an S1-MME interface.

8. The MeNB of claim 1, wherein the processor is further configured to control a Macro Cell (MCG), wherein the MCG includes one or more SeNBs.

9. The MeNB of claim 1, wherein the cellular transceiver is further coupled to a Serving Gateway (SGW).

10. The MeNB of claim 9, wherein the cellular transceiver is coupled to the SGW via an S1-U interface.

11. The MeNB of claim 1, wherein the processor is further configured to move the SCG bearer according to a dual connectivity (DC) procedure, the DC procedure enabling communication of radio resources to two different network nodes.

12. A non-transitory computer readable medium having instructions stored thereon that, when executed by one or more processors of a Master eNB (MeNB), causes the MeNB to perform operations comprising:
    generating an offload indication indicating whether or not a Secondary eNB (SeNB) can offload traffic of a Secondary Cell Group (SCG) bearer of an SCG to the Internet; and
    transmitting the offload indication to the SCG.

13. The non-transitory computer readable medium of claim 12, wherein the transmitting the offload indication to the SCG is performed via an X2 connection.

14. The non-transitory computer readable medium of claim 13, wherein the X2 connection is configured to communicate both Control Plane (C-plane) and User Plane (U-plane) traffic.

15. The non-transitory computer readable medium of claim 12, the operations further comprising receiving offload information corresponding to the SeNB from a Mobility Management Entity (MME).

16. The non-transitory computer readable medium of claim 15, wherein the offload information is received via an Information Element (IE) message.

17. The non-transitory computer readable medium of claim 12, the operations further comprising controlling a Macro Cell (MCG), wherein the MCG includes one or more SeNBs.

18. The non-transitory computer readable medium of claim 12, the operations further comprising moving the SCG bearer according to a dual connectivity (DC) procedure, the DC procedure enabling communication of radio resources to two different network nodes.

19. A method of operating a Master eNB (MeNB) comprising:
   generating an offload indication indicating whether or not a Secondary eNB (SeNB) can offload traffic of a Secondary Cell Group (SCG) bearer of an SCG to the Internet; and
   transmitting the offload indication to the SCG.

20. The method of claim 19, further comprising moving the SCG bearer according to a dual connectivity (DC) procedure, the DC procedure enabling communication of radio resources to two different network nodes.

\* \* \* \* \*